Figure 1:
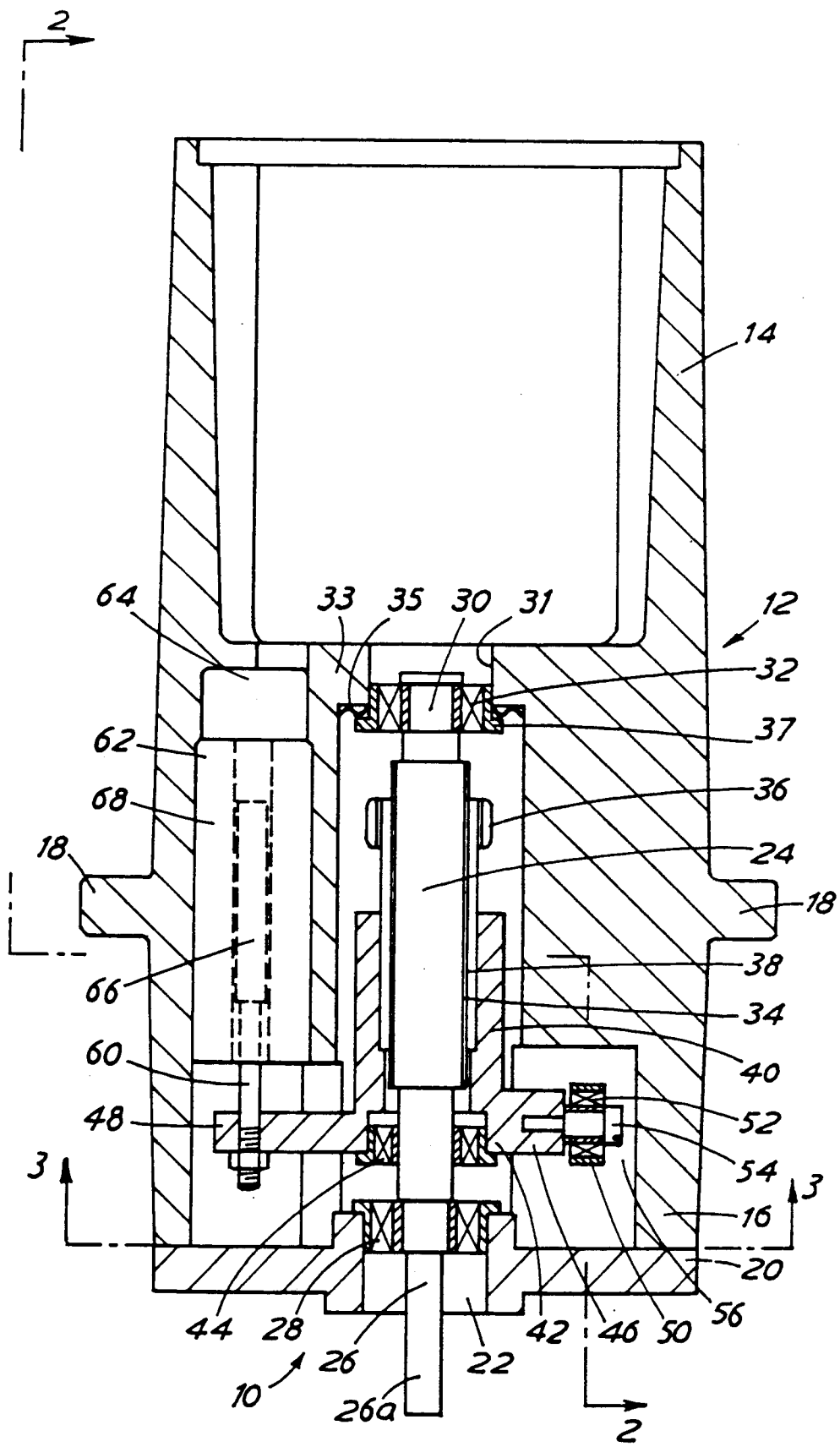

United States Patent [19]
Pullen

[11] Patent Number: 4,989,329
[45] Date of Patent: Feb. 5, 1991

[54] ROTARY DISPLACEMENT TRANSDUCERS

[75] Inventor: Roger J. Pullen, Nyetimber, England

[73] Assignee: Schlumberger Industries Limited, Farnborough, England

[21] Appl. No.: 327,290

[22] Filed: Mar. 22, 1989

[30] Foreign Application Priority Data

Mar. 31, 1988 [GB] United Kingdom ............... 8807671

[51] Int. Cl.$^5$ .......................... G01B 5/24; G01D 5/04
[52] U.S. Cl. ...................... 33/1 PT; 33/1 N; 33/793
[58] Field of Search ............ 33/1 N, 1 PT, 739, 819, 33/820, 827, 555, 789, 708, 793, 806, 818; 73/319, 320; 74/89.15, 424.8 R, DIG. 7

[56] References Cited

U.S. PATENT DOCUMENTS

| | | | |
|---|---|---|---|
| 1,070,973 | 8/1913 | MacGregor | 73/320 |
| 1,419,004 | 6/1922 | Allen | 33/818 |
| 2,059,141 | 10/1936 | Pillischafske | 33/827 |
| 2,789,362 | 4/1957 | Maroth | 33/366 |
| 3,190,007 | 6/1965 | Nicola et al. | 33/789 |
| 3,546,930 | 12/1970 | Flarsheim | 74/89.15 |
| 4,369,578 | 1/1983 | Ernst | 33/1 PT |
| 4,495,700 | 1/1985 | Ernst | 33/1 N |
| 4,586,259 | 5/1986 | Kato | 33/1 PT |
| 4,636,792 | 1/1987 | Watson | 33/1 PT |
| 4,779,473 | 10/1988 | Grady et al. | 74/89.15 |

FOREIGN PATENT DOCUMENTS

| | | |
|---|---|---|
| 0043311 | 3/1984 | Japan ............... 33/1 N |
| 645898 | 11/1950 | United Kingdom . |
| 863973 | 3/1961 | United Kingdom . |
| 1129251 | 10/1968 | United Kingdom . |

Primary Examiner—William A. Cuchlinski, Jr.
Assistant Examiner—C. M. Fulton
Attorney, Agent, or Firm—Sanford J. Asman

[57] ABSTRACT

A rotary displacement transducer comprises a shaft rotatably supported in a housing, and to which the rotary displacement to be sensed is applied. The shaft is axially fixed in the housing, and has a precision screw thread formed over part of its length. An internally threaded sleeve coaxially surrounds the shaft in threaded engagement with the precision screw thread, the sleeve carrying a collar having two diametrically opposed radial projections. The first projection carries a roller which engages in a slot in the housing to prevent the collar and sleeve rotating as the shaft is rotated, so that rotation of the shaft causes the sleeve and collar to move axially of the shaft by an amount dependent on the rotary displacement to be sensed. The axial movement of the collar is sensed by a linear displacement transducer of the LVDT type coupled to the other radial projection on the collar.

10 Claims, 3 Drawing Sheets

ROTARY DISPLACEMENT TRANSDUCERS

This invention relates to rotary displacement transducers, and is more particularly but not exclusively concerned with a rotary displacement transducer for use in applications, such as aerospace applications where they may be subject to continuous vibration.

One known form of rotary displacement transducer comprises a multi-turn rotary potentiometer, in which a wiper (or pick-off) moves along a resistive winding. However, when such a potentiometer is used in a high vibrate on environment, the wiper tends to vibrate on the resistive winding, leading to excessive wear and eventual failure. It is an object of the present invention to provide a rotary displacement transducer which is not subject to this drawback.

According to the present invention, there is provided a rotary displacement transducer comprising:
  a housing;
  a rotary member rotatably supported in the housing, the rotary member being rotatable in dependence upon the rotary displacement to be sensed but axially fixed, and having a precision screw thread formed thereon;
  a threaded member mounted in threaded engagement with the precision screw thread;
  means for preventing the threaded member from rotating during rotation of the rotary member, whereby the threaded member moves axially of the rotary member as the rotary member rotates; and
  a linear displacement transducer coupled to said threaded member to sense the axial displacement thereof.

Preferably, said preventing means comprises a projection extending radially of said threaded member and having at its outer end a roller running in a slot in the housing. Advantageously, the roller is rotatably supported on said projection by a bearing, and the width o f the slot, in a direction perpendicular to both the radial projection and the axis of the rotary member, is substantially equal to the diameter of the roller.

In a preferred embodiment of the invention, the rotary member comprises a shaft having the precision screw thread formed on its external surface.

Advantageously, the shaft is supported in the housing in two bearings which are axially spaced apart along the shaft, one on each side of the precision screw thread.

The threaded member preferably comprises a cylindrical sleeve which coaxially surrounds the shaft and has its thread formed on its internal surface.

The radial projection is preferably at one axial end of the cylindrical sleeve, beyond the region of threaded engagement between the sleeve and the precision screw thread on the shaft, and substantially diametrically opposite a second radial projection, the second radial projection being coupled to the linear displacement transducer.

Said one axial end of the cylindrical sleeve is preferably rotatably supported on the shaft by a bearing.

Conveniently, the linear displacement transducer is an inductive transducer, preferably of the kind incorporating a linear variable differential transformer.

Figure 2:
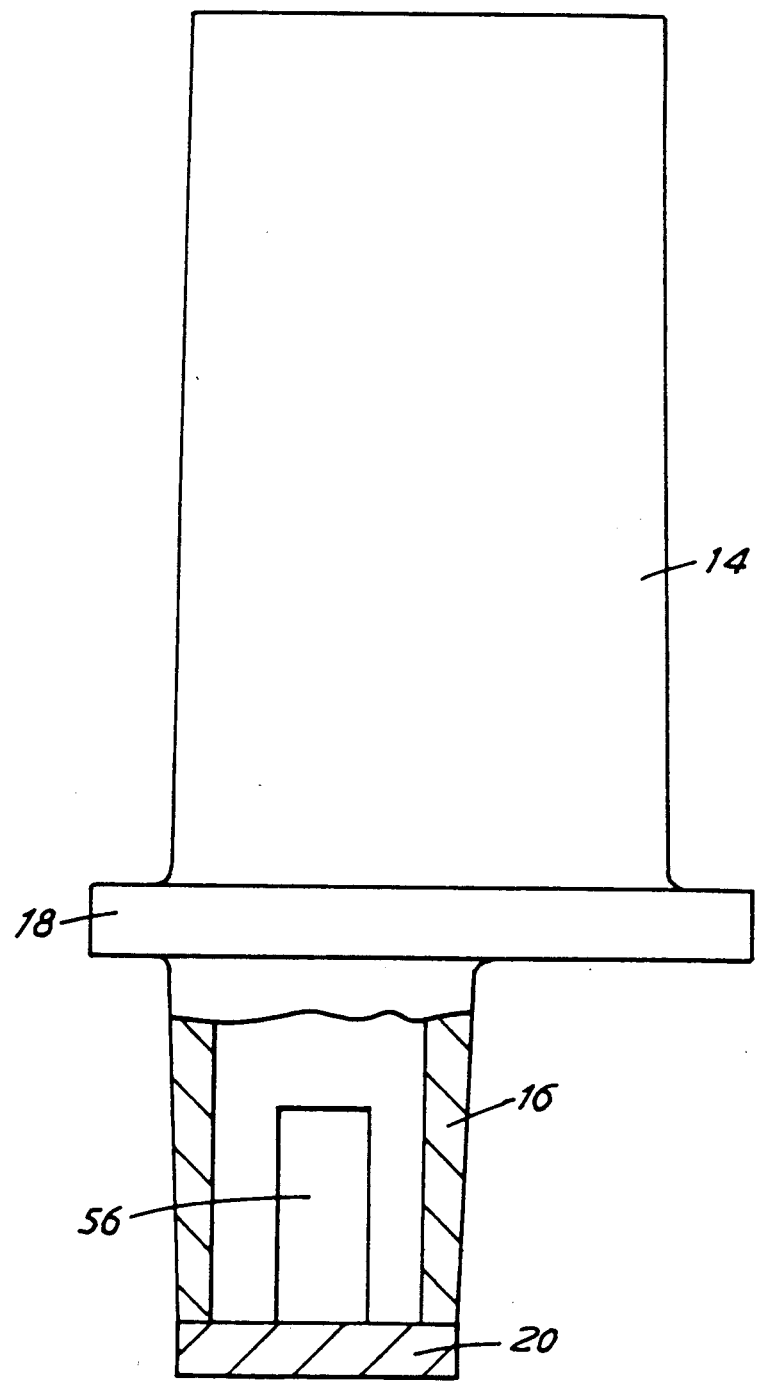
Figure 3:
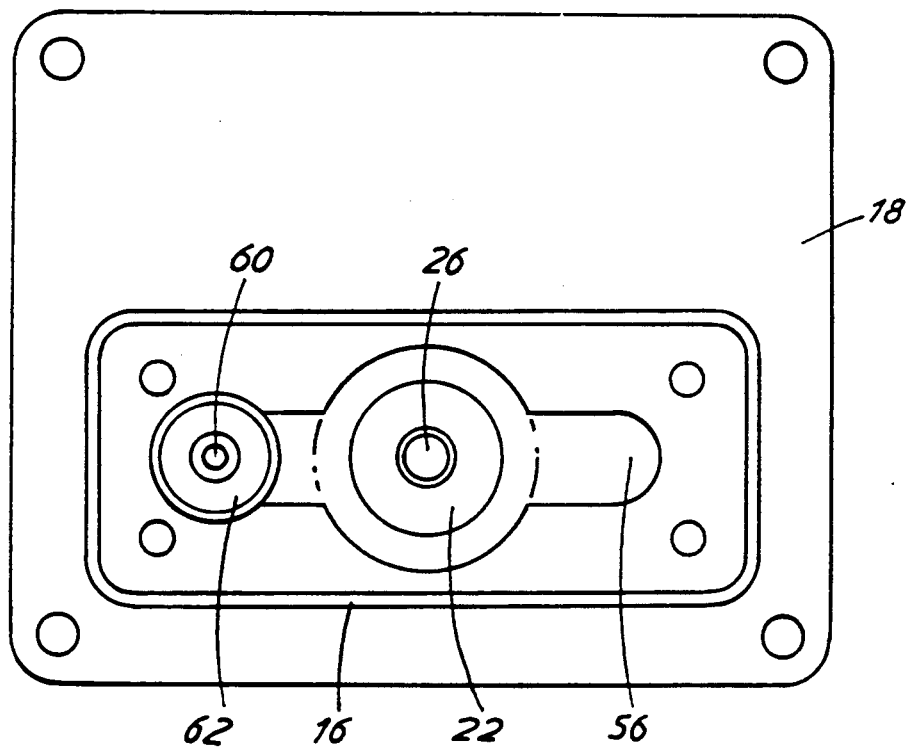

The invention will now be described, by way of example only, with reference to the accompanying drawings, of which:

FIG. 1 is a sectional view of a rotary displacement transducer in accordance with the invention; and FIGS. 2 and 3 are sectional views on the lines 2—2 and 3—3 respectively of FIG. 1.

The rotary displacement transducer shown in the drawings is indicated generally at 10, and comprises a generally rectangular housing 12 comprising upper and lower housing portions 14,16 separated by a mounting flange 18. The lower housing portion 16 has an open lower end, which is closed by a cover plate 20 having a central aperture 22. A shaft 24 has one end 26 secured and rotatably supported in a first bearing 28 fixed in the aperture 22, such that a short length 26a of the end 26 protrudes from the housing 12. The other end 30 of the shaft 24 is secured and rotatably supported in a second bearing 32 located in an aperture 31 in an internal partition wall 33 extending transversely across the housing 12, the bearing 32 being resiliently urged away from the wall 33 by means of a wave spring washer 35 which coaxially surrounds the bearing 32 and is entrapped between the wall 33 and an annular flange 37 provided on the bearing. The shaft 24 is thus prevented from axial movement within the housing 12 by virtue of the preloading provided between the bearings 28, 32 by the spring washer 35.

The shaft 24 has a precision screw thread 34 formed on its external surface between the bearings 28,32. A cylindrical sleeve 36 coaxially surrounds the shaft 24 in the region of the screw thread 34, this sleeve having an internal screw thread 38 engaged with the screw thread 34. The end of the sleeve 36 nearer the end 26 of the shaft 24 carries a cylindrical collar 40 which is coaxial with and secured to the sleeve and which projects axially slightly beyond the end of the sleeve, as indicated at 42. The projecting end 42 of the collar 40 is rotatably supported from the shaft 12 by a third bearing 44, and is provided with first and second diametrically opposed radial projections 46,48.

The radial projection 46 has a cylindrical roller 50 incorporating a bearing 52 secured to it by means of a bolt 54, such that its axis extends radially of the collar 40. The roller 50 is disposed in a slot 56 in the housing 12, the slot extending parallel to the shaft 24 and being of substantially the same width, measured perpendicularly to the plane of FIG. 1 (i.e. in a direction perpendicular to both the radial projection 46 and the axis of the shaft 24), as the roller 50.

The radial projection 48 is coupled to the shaft 60 of an LVDT (linear variable differential transformer) displacement transducer 62 mounted parallel to the shaft 24 (i.e. with the shaft 60 parallel to the shaft 24) in a recess 64 within the housing 12. The transducer 62 is of known kind, and may for example be of the kind described in our co-pending UK Patent Application No. 8722772 (Publication No. 2 192 126). Briefly, the shaft 60 is coupled within the transducer 62 to an armature 66 coaxial with the shaft and movable axially within the windings of a differential transformer 68 which coaxially surround the armature, so varying their mutual inductance in dependence upon the axial position of the armature and shaft. The signal conditioning circuitry for supplying AC input signals to, and receiving the resulting AC output signals from, the transformer 68 in the transducer 62 is also of known kind, and is mounted on a printed circuit board (not shown) mounted within the upper housing portion 14 of the housing 12.

In use, a rotary displacement to be sensed is applied, either directly or by way of gears or like drive means, to the shaft 24, so as to cause it to rotate within the housing 12 through an angle of rotation dependent upon the rotary displacement to be sensed. As already mentioned, the shaft 24 cannot move axially, while the sleeve 36 and collar 40 are prevented from rotating with the shaft 24 by virtue of the engagement of the roller 50 in the slot 56. As a result, the sleeve 36 and collar 40 are driven by the engagement of the screw threads 34,38 to move axially of the shaft 24 by an amount which is accurately proportional to the angle of rotation of the shaft, and therefore to the rotary displacement to be sensed.

The axial movement of the sleeve 36 and the collar 40 is exactly transferred to and duplicated by the shaft 60, and so sensed by the transducer 62, which therefore produces an output signal proportional to the rotary displacement to be sensed.

The use of the roller 50 and slot 56 to prevent rotation of the sleeve 36 and collar 40 with the shaft 24 substantially reduces friction and wear, and thus enhances the life and repeatability of the transducer 10.

Various modifications can be made to the described embodiment of the invention. In particular, inductive linear displacement transducers other than the LVDT kind can be used in place of the transducer 62: indeed, any convenient kind of linear displacement transducer can replace the transducer 62.

I claim:

1. A rotary displacement transducer comprising:
   a housing;
   a rotary member rotatably supported in the housing, the rotary member being rotatable in dependence upon the rotary displacement to be sensed but axially fixed, and having a precision screw thread formed thereon;
   a threaded member mounted in threaded engagement with the precision screw thread;
   means for preventing the threaded member from rotating during rotation of the rotary member, whereby the threaded member moves axially of the rotary member as the rotary member rotates; and
   a linear displacement transducer coupled to said threaded member to sense the axial displacement thereof;
   wherein said preventing means comprises a projection extending radially of said threaded member and having at its outer end a roller running in a slot in the housing.

2. A rotary displacement transducer as claimed in claim 1, wherein the roller is rotatably supported on said projection by a bearing.

3. A rotary displacement transducer as claimed in claim 1, wherein the width of said slot, in a direction perpendicular to both said radial projection and the axis of the rotary member, is substantially equal to the diameter of the roller.

4. A rotary displacement transducer as claimed in claim 1, wherein the rotary member comprises a shaft having the precision screw thread formed on its external surface.

5. A rotary displacement transducer as claimed in claim 4, wherein the shaft is supported in the housing in two bearings which are axially spaced apart along the shaft, one on each side of the precision screw thread.

6. A rotary displacement transducer as claimed in claim 4, wherein the threaded member comprises a cylindrical sleeve which coaxially surrounds the shaft and has its thread formed on its internal surface.

7. A rotary displacement transducer as claimed in claim 1, wherein said radial projection is at one axial end of the cylindrical sleeve, beyond the region of threaded engagement between the sleeve and the precision screw thread on the shaft, and substantially diametrically opposite a second radial projection, the second radial projection being coupled to the linear displacement transducer.

8. A rotary displacement transducer as claimed in claim 7, wherein said one axial end of the cylindrical sleeve is rotatably supported on the shaft by a bearing.

9. A rotary displacement transducer as claimed in claim 1, wherein the linear displacement transducer is an inductive transducer.

10. A rotary displacement transducer as claimed in claim 4, wherein the linear displacement transducer is of the kind incorporating a linear differential voltage transformer.

* * * * *